United States Patent [19]
Overton et al.

[11] Patent Number: 5,653,109
[45] Date of Patent: Aug. 5, 1997

[54] ANNULAR COMBUSTOR WITH FUEL MANIFOLD

[75] Inventors: Dennis L. Overton; Leighton Jones, both of Bristol, Great Britain

[73] Assignee: Rolls-Royce PLC, London, Great Britain

[21] Appl. No.: 597,990

[22] Filed: Feb. 7, 1996

[30] Foreign Application Priority Data

Mar. 15, 1995 [GB] United Kingdom ............ 9505247

[51] Int. Cl.⁶ ............................................. F23R 3/34
[52] U.S. Cl. ........................................ 60/739; 60/746
[58] Field of Search ................... 60/39.36, 734, 60/739, 746, 747, 752

[56] References Cited

U.S. PATENT DOCUMENTS

| | | |
|---|---|---|
| 2,541,108 | 2/1951 | Sforzini . |
| 2,920,449 | 1/1960 | Johnson et al. . |
| 3,930,369 | 1/1976 | Verdouw . |
| 4,158,949 | 6/1979 | Reider . |
| 4,499,735 | 2/1985 | Moore et al. ............... 60/739 |
| 5,231,833 | 8/1993 | MacLean et al. ............ 60/739 |
| 5,289,685 | 3/1994 | Hoffa . |
| 5,361,586 | 11/1994 | McWhirter et al. .......... 60/739 |

FOREIGN PATENT DOCUMENTS

| | | |
|---|---|---|
| 1-0521687 | 1/1993 | European Pat. Off. . |
| 1-329944 | 9/1973 | United Kingdom . |
| 2-100412 | 12/1982 | United Kingdom . |
| 2-158570 | 11/1985 | United Kingdom . |
| 2263733 | 8/1993 | United Kingdom . |

*Primary Examiner*—Louis J. Casaregola
*Attorney, Agent, or Firm*—Oliff & Berridge

[57] ABSTRACT

An annular combustor structure particularly suited to staged combustion has a faired centrebody incorporating a diffuser in the head of the combustor. The structure carries fuel injector mountings for pilot and main stage combustion which receive fuel from respective manifolds running around the hollow interior of the structure. There are two annular chambers each containing a fuel manifold, and cooling air passes through the chambers before entering the combustion volume. The manifolds are connected to an external source of fuel by conduits which pass radially through the combustion chamber outer casing walls.

5 Claims, 2 Drawing Sheets

6,653,109

ANNULAR COMBUSTOR WITH FUEL MANIFOLD

BACKGROUND OF THE INVENTION

1. Field of the Invention

The invention relates to an annular combustor arrangement. In particular it concerns the fuel supply manifold arrangements for a staged combustor.

2. Description of Related Art

It is now common practice in gas turbine engine combustion chamber design to use multiple combustion zones, ie fuel staging, for dual improvements of controlling exhaust emissions and enabling the combustor to operate over a wide range of air/fuel ratios. It follows therefore, since there are normally separate arrays of fuel injectors for each combustion stage, that this type of combustor employs more fuel injectors than a conventional non-staged combustor. The corresponding fuel manifolds and supply pipe work, following conventional design practice, are mounted externally of the combustion chamber outer casing and each fuel injector is connected individually to its associated fuel manifold by radially extending fuel conduits passing through the combustion chamber walls. A drawback with such a combustor arrangement is its intrinsically heavy weight.

A further drawback arises in a bypass engine where the fuel manifolds are located within the bypass duct. Consequently the fuel manifolds are subjected to aerodynamic buffeting and heat transfer of the fan bypass airflow, and are susceptible to impact damage arising from foreign object ingestion at the front of the engine.

The present invention seeks to avoid these disadvantages and to provide a lighter arrangement with improved damage resistance.

SUMMARY OF THE INVENTION

According to the present invention there is provided an annular combustor comprising
 a combustion chamber casing defining an annular combustion volume,
 a plurality of fuel injector means spaced apart around the combustion chamber casing for injecting a fuel/air mixture into the combustion volume,
 fuel manifold means mounted internally of the combustion chamber casing in a cool part of the chamber adjacent to the fuel injector means and connected to fuel supply conduit means passing through the combustion chamber casing to receive fuel from an external fuel source.

In one form of the invention the fuel injector means comprises an annular combustor adapted for staged combustion wherein the fuel injector means comprises a first plurality of pilot fuel injector means for pilot stage combustion and a second plurality of main fuel injector means for main stage combustion, and the fuel manifold means likewise comprises a first manifold disposed within the combustion chamber casing to supply the pilot stage fuel injector means and a second manifold means disposed within the combustion chamber casing to supply the main stage fuel injector means, said first and second manifold means being mounted in a cool part of the chamber and connected to the external fuel source by respective first and second conduit means passing through the chamber casing.

Preferably the combustion chamber casing includes a hollow annular chamber defining a head of the combustion chamber, within which said fuel manifold means is routed to interconnect the plurality of fuel injector means.

BRIEF DESCRIPTION OF DRAWINGS

The invention and an embodiment for carrying it into practice will now be described by way of example with reference to the accompanying drawings, in which.

DETAILED DESCRIPTION OF PREFERRED EMBODIMENTS

Figure 1:
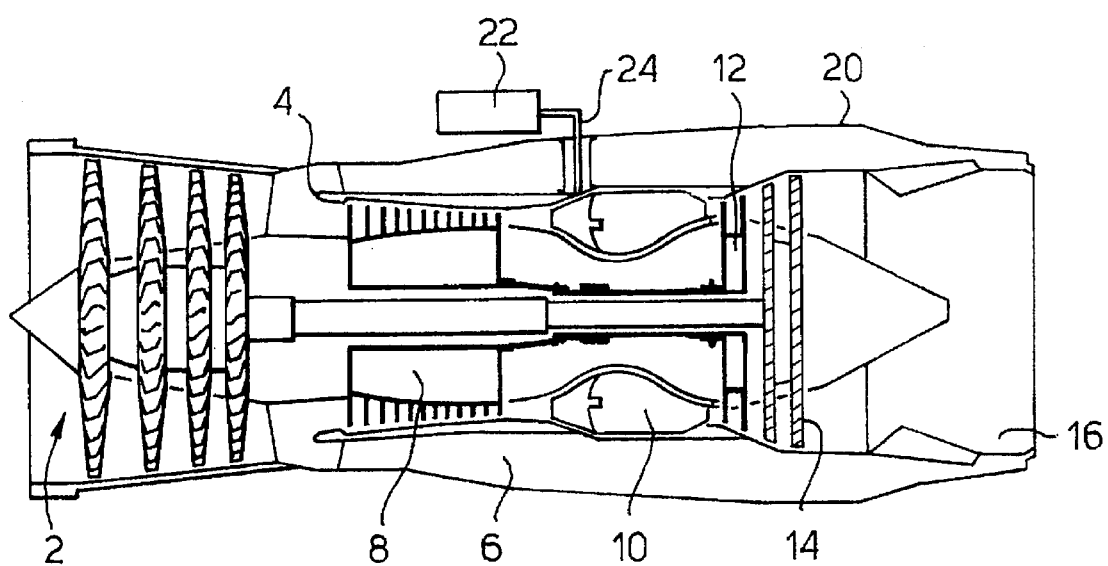
FIG. 1 shows in schematic form a longitudinal section through a bypass engine.

Referring now to FIG. 1, there is shown in schematic form a longitudinal section through a bypass gas turbine engine to illustrate its major components. Typically the engine comprises a fan or low pressure (LP) compressor section 2, an airflow splitter 4 leading into a bypass duct 6 and a high pressure (HP) compressor 8, a combustion section 10, high pressure (HP) and low pressure (LP) turbines 12,14 respectively and finally an exhaust nozzle 16 which receives flow from both the LP turbine 14 and the bypass duct. Also shown in FIG. 1 is engine outer casing 20 with mounted on its exterior surface a fuel supply unit 22. Fuel is carried from an outlet of unit 22 through the engine casing 20 and across the bypass duct 6 by a conduit 24 which supplies fuel to a manifold to which individual fuel injectors (not shown) in the combustor section 10 are connected.

Figure 2:
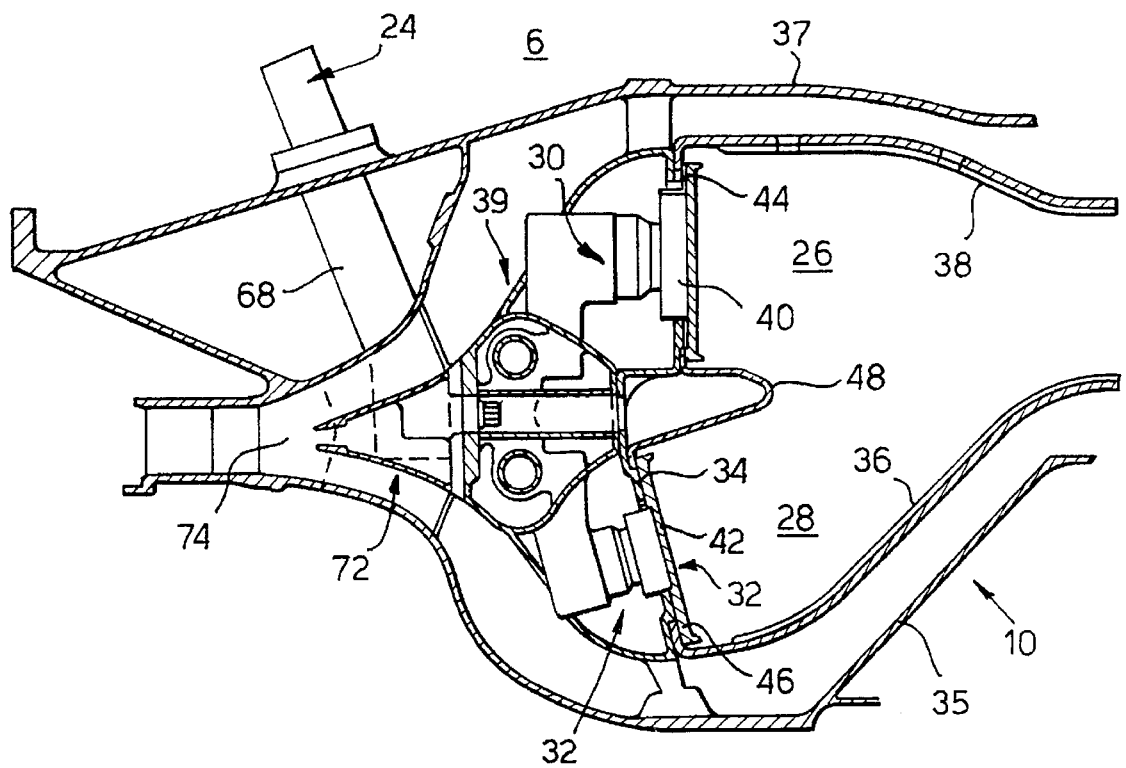
FIG. 2 shows a section through an annular staged combustor in which the fuel injector manifolds are housed within a hollow combustor head structure.

The combustor or combustion chamber 10 has an annular configuration which will now be described in greater detail with reference to FIGS. 2 and 3 of the drawings. The chamber incorporates, by now familiar, staged combustion technology in accordance with which the chamber internal volume is notionally divided into a radially outward, annular main combustion zone 26 and a radially inward, annular pilot combustion zone 28. Both combustion zones 26,28 are fed with fuel/air mixture from separate series of fuel injectors. A first series of main fuel injectors 30 are spaced apart around an upstream wall 34 or head of the combustion at a first radius greater than that of a second series of pilot fuel injectors 32 also spaced apart around the head of the combustor at a second radius smaller than the first radius. There are not necessarily the same number of main and pilot injectors, although this is the case in the presently described example since the pilot and main injectors are paired and mounted on the same radius.

The combustion chamber 10 is housed within a section of outer casing comprising radially inner and outer walls 35,37 and co-axial therewith an inner casing consisting of radially inner and outer combustor barrels 36,38 which are located, or joined, to the inner and outer circumferences respectively of the annular upstream wall 34 also known as a metering panel. The annular metering panel 34 is carried by a generally dome-shaped, annular head assembly, generally indicated at 39, which is mounted from the outer casing walls 35,37. The outlet spray nozzles 40,42 of the injectors 30,32 are mounted co-axially with apertures formed in the wall 34 which may carry similarly apertured thermally protective heatshield tiles 44,46. The main and pilot combustion zones 26,28 are partially segregated by an annular splitter 48 which projects a short distance into the combustion volumes from the upstream end wall 34 at an intermediate radius between the two zones. The splitter 48 is preferably, as in the present example, hollow and supplied with internal cooling air through further apertures 50 formed in the wall 34 and spaced apart around it.

Figure 3:
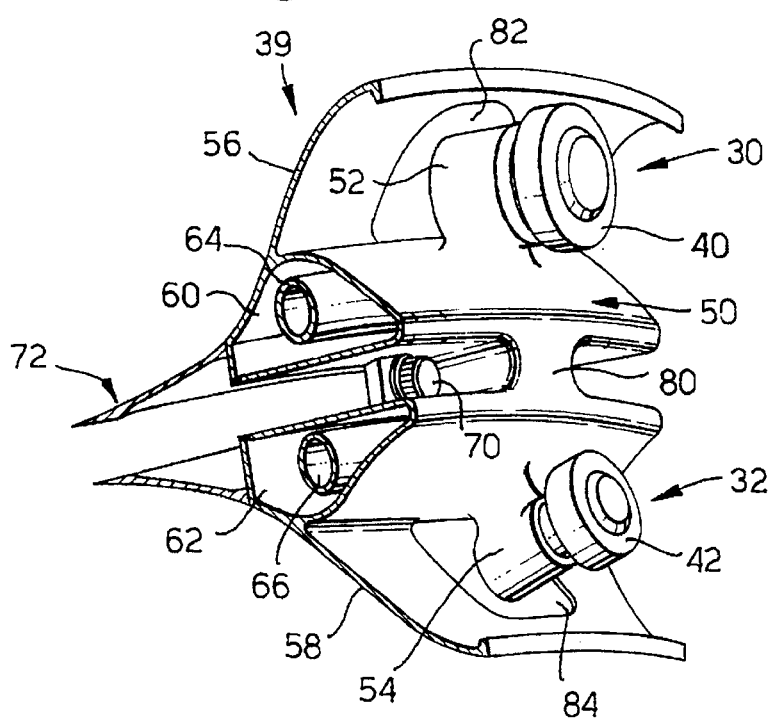
FIG. 3 shows a segment of the hollow combustor head including two staged fuel injectors and portions of the fuel manifolds.

The combustor head 39 comprises an assembly including an annular, hollow centrebody 50, a segment of which is seen in FIG. 3. In the example this is formed integrally with main and pilot fuel injector mountings 52,54 and domed-section wings 56,58 which curve from the centrebody towards the inner and outer combustor barrels 36,38 respectively. The central, hollow portion of the centrebody is divided into two chambers 60,62 inside which are contained the fuel manifold pipes 64,66. In the particular embodiment the whole annular centrebody is made up of a number of segments which are assembled one abutting another in a circumferential direction. The manifold pipes 64,66 run around the complete annulus thus forming complete hoops enclosed within the chambers 60,62. At intervals the manifold pipes include branches (not shown) which communicate through corresponding spray nozzle mountings with appropriate main or pilot spray nozzles.

The fuel manifolds are also connected to a source of fuel external of the engine casing, ie the fuel supply unit 22 (FIG. 1) through a generally, radially extending arm 68 which contains the fuel conduit 24. Thus, the fuel manifolds and fuel injector mountings incorporated within the centrebody replace the fuel manifolds conventionally mounted externally to the combustor section pressure casing ie the combustion chamber outer casing. By eliminating individual fuel spray supply pipes and, if required, fuel drain pipes only one pipe is required for the main spray nozzles and another for the pilot spray nozzles. This avoids the need for multiple injector mounting flanges on the combustor outer casing thereby substantially reducing component weight. Furthermore the arrangement also replaces manifolds contained within the bypass duct.

The centrebody segments are mounted by means of bolts 70 to a flanged section of an HP compressor outlet diffuser 72. The diffuser illustrated is a "wedged" or "faired" diffuser type mounted co-axially in the annular outlet passage 74 of the HP compressor outlet. The diffuser passage is divided into radially inner and outer annular passages. The leading edge of the diffuser 72 is formed with a slotted opening and the two diffuser surfaces 74,76 blend with the domed head wings 56,58. At intervals spaced apart circumferentially radial flanges 78 join the two diffuser surfaces 74,76 and provide mounting points for bolts 70 to join the diffuser to the combustor head segments 39. The combustor head segments are also formed with radially extending sections 80, in the illustrated embodiment these sections are adjacent the mounting bolts 70. The sections 80 may be solid or hollow provided communication between the hollow chambers 60,62 of the centrebody. Between the radial section 80 the centrebody is slotted to provide airflow passages for air entering through the leading edge of the diffuser. In this example this air is admitted to the interior of the combustor zone splitter 48 for internal cooling.

Apertures are provided, preferably, in the centrebody to admit air to the fuel manifold chambers 60,62 also for cooling purposes. Further apertures such as 82,84 may be provided in the wings of the centrebody adjacent the spray nozzle mountings, this air thus entering the volume immediately behind metering panel 34.

What we claim is:

1. An annular combustor adapted for staged combustion, comprising a combustion chamber casing defining an annular combustion volume and including a hollow annular structure defining a head of a combustion chamber, said hollow annular structure being divided into first and second concentric annular internal chambers spaced apart by a radial distance;

a first plurality of pilot fuel injector means for pilot stage combustion disposed within the combustion chamber adjacent the first annular internal chamber of the hollow annular structure, and a second plurality of main fuel injector means for main stage combustion disposed within the combustion chamber adjacent the second annular internal chamber of the hollow annular structure;

first fuel manifold means mounted within the first annular internal chamber and connected to supply fuel to the pilot stage fuel injector means;

second fuel manifold means mounted within the second annular internal chamber and connected to supply fuel to the main stage fuel injector means; and fuel supply conduit means connected to said first and second fuel manifold means and passing through the combustion chamber casing to receive fuel from an external fuel source.

2. An annular combustor as claimed in claim 1, wherein the hollow annular structure defining a head of the combustion chamber is cooled by a flow of air entering the combustion chamber.

3. An annular combustor as claimed in claim 2 wherein the hollow annular structure defining a head of the combustion chamber is formed as a passageway for air entering the combustion chamber.

4. An annular combustor as claimed in claim 1 wherein the hollow annular structure defining the head of the combustion chamber comprises a faired structure forming part of a combustion chamber inlet diffuser.

5. An annular combustor as claimed in claim 1, wherein the annular structure is formed integrally with means for mounting the first and second fuel injector means.

\* \* \* \* \*